US008881348B2

(12) United States Patent
Teranishi (10) Patent No.: US 8,881,348 B2
(45) Date of Patent: Nov. 11, 2014

(54) TENSION TOOL

(75) Inventor: Ryouhei Teranishi, Ama (JP)

(73) Assignee: Ryouhei Teranishi, Ama (JP)

( * ) Notice: Subject to any disclaimer, the term of this patent is extended or adjusted under 35 U.S.C. 154(b) by 0 days.

(21) Appl. No.: 14/005,638

(22) PCT Filed: Nov. 7, 2011

(86) PCT No.: PCT/JP2011/075605
§ 371 (c)(1),
(2), (4) Date: Sep. 17, 2013

(87) PCT Pub. No.: WO2013/069081
PCT Pub. Date: May 16, 2013

(65) Prior Publication Data
US 2014/0007390 A1 Jan. 9, 2014

(51) Int. Cl.
*F16G 11/12* (2006.01)
*F16G 3/00* (2006.01)
*F16G 13/12* (2006.01)
*F16G 15/00* (2006.01)
*F16B 2/06* (2006.01)
*F16B 45/00* (2006.01)

(52) U.S. Cl.
CPC ............... *F16G 11/12* (2013.01); *F16G 3/006* (2013.01); *F16G 13/12* (2013.01); *F16G 15/00* (2013.01); *F16B 2/065* (2013.01); *F16B 45/00* (2013.01)
USPC ..................... 24/68 CT; 24/68 R; 254/231

(58) Field of Classification Search
CPC ......... B25B 29/00; B25B 29/02; F16G 11/00; F16G 11/12
USPC .......... 24/68 CT, 525, 559, 71.1; 254/231, 31
See application file for complete search history.

(56) References Cited

U.S. PATENT DOCUMENTS

| 775,355 | A | * | 11/1904 | Smith | 254/231 |
|---|---|---|---|---|---|
| 1,285,517 | A | * | 11/1918 | White | 296/128 |
| 1,656,776 | A | * | 1/1928 | Davidson | 24/577.1 |
| 3,366,997 | A | * | 2/1968 | Lesley | 24/68 R |
| 3,469,810 | A | * | 9/1969 | Dorris | 248/228.3 |
| 3,747,971 | A | * | 7/1973 | Yake | 294/82.11 |
| 5,205,543 | A | * | 4/1993 | Thiede | 254/231 |
| 2008/0235922 | A1 | * | 10/2008 | Scott | 24/68 CT |

FOREIGN PATENT DOCUMENTS

| JP | 43-23458 Y | 10/1968 |
|---|---|---|
| JP | 01-216140 | 8/1989 |
| JP | 04-300408 | 10/1992 |
| JP | 2001-124021 | 5/2001 |
| JP | 2006-070572 | 3/2006 |

OTHER PUBLICATIONS

EPO machine translation for JP 2006-070572, retrieved Sep. 17, 2014, document published Mar. 16, 2006.*
International Search Report for corresponding International Application No. PCT/JP2011/075605, Jan. 31, 2012.
Written Opinion for corresponding International Application No. PCT/JP2011/075605, Jan. 31, 2012.

* cited by examiner

*Primary Examiner* — Robert J Sandy
*Assistant Examiner* — Rowland Do
(74) *Attorney, Agent, or Firm* — Mori & Ward, LLP (57) ABSTRACT

A tension tool includes: a shaft body that has a first locking portion formed at one end portion thereof and a screw portion formed from the other end portion thereof to a screw portion; a cylindrical body that holds the shaft body to interpose a gap therebetween and has a second locking portion attached to a lateral side thereof; and a nut that is disposed to the screw portion in contact with the other end portion side of the cylindrical body and adjusts a separation length between the first locking portion and the second locking portion. Further, the gap is interposed between the cylindrical body and the shaft body, and a virtual line connecting the two locking portions and an axial line formed by the shaft body are inclined. Preferably the first locking portion is a hook and a distal end thereof is bent in the lateral direction.

4 Claims, 10 Drawing Sheets

TENSION TOOL

TECHNICAL FIELD

The present invention relates to a tension tool that is hooked on a linear material such as a chain or a wire rope slackly stretched and eliminates this slack.

BACKGROUND ART

A position of a concrete placement form for reinforced concrete structures is held by horizontal and vertical frame materials so that this form is not displaced and deformed by a pressure of concrete in a fluid state during concrete placement. Further, the frame materials are bound by a bundling material for strut materials and a linear material such as a chain which is a tension material so that the frame materials are not displaced even though vibration or a pressure during concrete placement is applied thereto. Furthermore, in shipping transportation, a container to be transported is fastened with a wire rope or the like without looseness so that it cannot be displaced. Tensile force of these linear materials, e.g., a chain or a wire rope is adjusted by a tension tool such as a turnbuckle so as to prevent slack from being produced.

The turnbuckle is a tension tool which has a screw thread, to which a treaded rod of a right screw is screwed from one end thereof and a threaded rod of a left screw is screwed from the other end thereof, is formed at each of both ends of a body frame, and which moves positions of the threaded rods at both the ends closer to or away from each other by rotating the body frame. A locking portion such as a hook is formed at an end portion of each threaded rod, and the locking portion is locked with respect to a chain or a wire as a linear material whose tensile force is adjusted. The turnbuckle has an advantage that a length for pulling in the hooks at both the ends closer can be increased, whereas it has a problem that the number of times of rotation of the turnbuckle is increased and tensile force adjustment takes time and labor when the length for pulling in is long and that the body frame is close to the linear material and hence the body frame is hard to rotate when the linear material is not loose enough.

Thus, Japanese Unexamined Patent Application Publication No. 1992-300408 discloses the technology by which protruding portions are formed at a plurality of positions on an inner shaft along a body frame, notch portions are formed in an engagement plate placed at an end portion of an outer cylinder of the body frame, the inner shaft is axially slid along the body frame, the protruding portions are engaged with the notch portions, whereby a length between respective coupling tools formed at the end portion of the body frame and the end portion of the inner shaft can be adjusted. According to this technology, the length between the coupling tools at both the ends of the turnbuckle can be easily adjusted, whereas there is a problem that the number of components constituting the turnbuckle increases.

Further, Japanese Unexamined Patent Application Publication No. 2006-070572 discloses the technology of an adjustment tool that has hook portions on both a head side of a bolt and a distal end side of a shaft body of the bolt, attaches hooked cylindrical bodies freely fitted onto the shaft body, and fastens a nut, and thereby adjusts a distance between the two hooked cylindrical bodies to eliminate slack of a chain or the like for hanging a work platform.

According to this technology, since the pair of hooks are secured to lateral sides on the bolt head side and the bolt distal end side, and the bolt or the like cannot enter between the pair of upper and lower hooks. Furthermore, when the pair of hooks are arranged to face each other, the pair of hooks can be held in an opposed state, the hook on the bolt head side can be placed on the upper side, the hook on the bolt head side and the bolt shaft portion can be simultaneously held with one hand, the hook can be easily engaged with an upper link of the chain, and the hook on the bolt end side can be easily engaged with a lower link of the chain.

However, in case of a chain stretched with less slack, at the time of engaging the hook on the bolt head side with the upper link, the hook on the bolt distal end side that is in the freely fitted state interferes with the other link and rotates, and hence the hook is hard to be hooked. Moreover, after the hook on the bolt head side is hooked, the hook on the bolt distal end side must be held with one hand, a position of the link of the chain placed on the bolt distal end side must be adjusted with the other hand while sliding the bolt shaft along the cylindrical body on the bolt head side, the hook on the bolt end side must be fitted to the link while paying attention to prevent the hook on the bolt head side which has been hooked before the counterpart from coming off the link, and hence there is a problem that disposing the coupling tool is difficult.

CITATION LIST

Patent Literatures

Patent Literature 1: Japanese Patent Application Publication No. 1992-300408
Patent Literature 2: Japanese Patent Application Publication No. 2006-070572

DISCLOSURE OF INVENTION

Problem to be Solved by the Invention

Therefore, it is an object of the present invention to provide a tension tool that can be easily disposed to a halfway position of a linear material that is stretched with less slack and facilitates fastening even though it has a simple structure.

Means for Solving Problem

According to a first invention of the present invention, there is provided a tension tool comprising: a shaft body; a cylindrical body; and a nut, wherein a first locking portion that locks at a first region is formed at one end portion of the shaft body, and a screw portion is formed from the other end portion of the same toward the first locking portion, the cylindrical body is fitted onto an outer periphery of the screw portion, and a second locking portion that locks at a second region is formed on an outer surface of the cylindrical body, the screw portion has the nut attached thereto in a state that the cylindrical body is fitted on the outer periphery of the shaft body, the first region and the second region, which are apart from each other, are moved closer to each other by fastening the nut, and the tension tool is characterized in that:
the cylindrical body is fitted on the outer periphery of the screw portion to form a gap therebetween; and
a virtual line connecting a first receiving portion that is in contact with the first region in the first locking portion with a second receiving portion that is in contact with the second region in the second locking portion and an axial line formed by a shaft center of the shaft body are inclined.

In the present invention, the first region means part of an object to be moved closer, and the second region means another part of the object to be moved closer. The object to be moved closer may be one object or may be different objects.

A shape of the first locking portion or the second locking portion may be each of various shapes such as a hook shape, an annular shape, or a "U"-like shape. Since the virtual line connecting the first receiving portion and the second receiving portion and the axial line formed by the shaft center of the shaft body are inclined, the end portion of the shaft body is placed at a position apart from the virtual line. Moreover, the nut fastened from the end portion of the shaft body can be fastened in an easy-to-operate state that the nut is apart from the virtual line and also apart from the object to be moved closer. As a result, even if a tool such as a ratchet wrench or an electric torque wrench is used, the fastening operation can be facilitated. Here, an inclination angle formed between the virtual line and the axial line formed by the shaft center of the shaft body is not restricted in particular.

Additionally, when a gap between the shaft body and the cylindrical body is a small width, the cylindrical body is not caught by the shaft body, and the operation of sliding the cylindrical body along the shaft body is easy.

In the tension tool according to the first invention, a second invention of the present invention is characterized in that a width of the gap is a width that enables the shaft body to incline in the cylindrical body and also enables an inner surface corner portion of the cylindrical body near the second locking portion to be hooked on a screw thread of the shaft body in a state that the first locking portion is slid and pulled toward the second locking portion and the cylindrical body is inclined.

When the width of the gap is a width that enables the shaft body to incline in the cylindrical body, the first locking portion can be pulled toward the second locking portion, the cylindrical body can be inclined, the inner surface corner portion of the cylindrical body near the second locking portion can be hooked on the screw thread of the shaft body, and the position of the cylindrical body can be temporarily held.

Further, with no reaction force of the cylindrical body, an operator can lightly rotate and fasten the nut attached to the shaft body with his/her fingertips until the nut reaches the end portion of the cylindrical body. As a result, an operation using a ratchet wrench or an electric torque wrench is a last fastening operation alone, a length for fastening using the tool is shortened, and the operation of fastening the nut can be further facilitated.

In the tension tool according to the second invention, a third invention of the present invention is characterized in that an engagement portion relative to a screw thread of the screw portion is formed on a second locking portion side inner surface of the nut side end portion in the cylindrical body, and the nut side of the engagement portion is protruded toward the screw thread side, the cylindrical body inner side of the engagement portion is the same surface as the cylindrical body inner surface, and the engagement portion in the cylindrical body is formed at a slant with respect to the shaft portion.

In the tension tool according to the third invention of the present invention, even if the width of the gap between the cylindrical body and the shaft body is small and the inclination of the shaft body in the cylindrical body is small, the second locking portion is slid toward the first locking portion side with the linear material being hooked in the first locking portion and the second locking portion, and the cylindrical body is inclined, whereby the engagement portion formed on the inner wall of the cylindrical body is caught on the screw thread. Further, a position of the cylindrical body is temporarily locked and held at the slide position.

The cylindrical body is temporarily locked at the position where the nut is apart from the cylindrical body, and the nut is fastened with fingertips until the nut comes into contact with the bottom portion of the cylindrical body with no reaction force of the cylindrical body. Furthermore, when the nut is in contact with the lower end portion of the cylindrical body and resistance at the time of fastening the nut increases, the nut is fastened with use of a tool such as a ratchet wrench. When the nut is further fastened and the cylindrical body is moved along the shaft, the engagement portion is disengaged, and the second locking portion enters the slidable state. Since the inner side of the engagement portion in the cylindrical body is the same surface as the inner surface of the cylindrical body, the engagement portion is not caught on the screw thread, and the cylindrical body moves with the nut by further fastening the nut.

As a result, even if the linear material has slack with the second locking portion of the cylindrical body being hooked on the linear material, the cylindrical body can be slid until slack is eliminated without operating the nut with use of a tool, the nut can be fastened by using the tool only on the final fastening stage after preliminarily the nut is rotated and fastened with fingertips, and hence the efficient fastening operation can be carried out.

In the tension tool according to the third invention, a fourth invention of the present invention is characterized in that the first region and the second regions are regions in a linear material, and the first locking portion is a hook portion. Here, the linear material is a chain, a wire rope, or a string material, namely, it means a member having a linear shape. The linear material may be one member or may be two members. Since the first locking portion is the hook portion, the shaft portion can be solely held or the cylindrical body and the shaft body can be held together, a direction of the distal end of the hook portion can be determined, and the distal end of the hook portion can be easily inserted and hooked in the link of the chain or the ring of the wire member having the ring formed at the end portion thereof.

In the tension tool according to the fourth invention, a fifth invention of the present invention is characterized in that a distal end of the hook portion is bent toward the lateral side from a position near a top portion of a bent portion with respect to plane along which the hook is bent and extended from a proximal end portion of the hook portion.

According to the fifth invention of the present invention, since the distal end of the hook portion is bent toward the lateral side with respect to the plane along which the hook is bent and extended from the proximal end portion of the hook portion, at the time of inserting the distal end of the hook into the ring of the linear material stretched with less slack, the shaft body of the tension tool gripped by an operator is placed apart from the linear material. At the time of inserting the hook portion which is the first locking portion into the ring, since the shaft body of the tension tool does not interfere with the linear material, the first locking portion of the tension tool can be easily hooked on a halfway position of the linear material stretched with less slack.

In the tension tool according to the first to fifth invention, a sixth invention of the present invention is characterized in that the inner surface of the cylindrical body is chamfered at a side end portion of the first locking portion of the cylindrical body.

When each of the first locking portion of the shaft portion and the second locking portion of the cylindrical portion is hooked on the linear material and tensile force acts between the first locking portion and the second locking portion, the shaft body is inclined in the cylindrical body. However, according to the sixth invention, since the inner surface of the cylindrical body is chamfered at the open end portion of the cylindrical body on the first locking side, the end portion of the cylindrical body on the first locking portion side is not caught on the screw thread of the shaft body at the time of sliding the cylindrical body toward the first locking portion side. As a result, the cylindrical body can be easily slid.

Effect of the Invention

According to the first invention of the present invention, the nut fastened from the end portion of the shaft body is apart from the virtual line connecting the first receiving portion with the second receiving portion and can be fastened in the easy-to-work state where the nut is apart from the object to move closer, and the fastening operation can be facilitated even if a tool, e.g., a ratchet wrench or an electric torque wrench is used. When the gap between the shaft body and the cylindrical body has a small width, the cylindrical body is not caught by the shaft body, and the cylindrical body can be easily slid along the shaft body. Further, when the gap between the shaft body and the cylindrical body is a width that enables inclining the shaft body in the cylindrical body, the position of the cylindrical body can be temporarily held, the nut attached to the shaft body can be rotated with fingertips of an operator and fastened until it comes into contact with the end portion of the cylindrical body, the operation performed with use of the ratchet wrench or the electric torque wrench alone is the final fastening operation, the length for fastening using the tool can be shortened, and the nut fastening operation can become more easy and efficient as advantageous effects. The operation of performing rotation with fingertips may be omitted as a matter of course. In this case, the operation of fastening the nut with use of the electric torque wrench can be smoothly carried out.

According to the second invention of the present invention, the inner surface corner portion of the cylindrical body can be hooked on the screw thread of the shaft body, the position of the cylindrical body can be temporarily held, the length for fastening using the tool can be shortened, and the operation of fastening the nut can be more facilitated.

According to the third invention of the present invention, even if the inclination of the shaft body is small in the cylindrical body, when the second locking portion is slid toward the first locking portion side with the linear material being caught on the first locking portion and the second locking portion, the engagement portion formed on the inner side of the cylindrical body is caught on the screw thread of the shaft body, and the shaft body is temporarily locked and held. Moreover, the cylindrical body is slid until slack is eliminated without operating the nut with use of a the tool, the nut is rotated and preliminarily fastened by fingertips, then the nut can be fastened by using the tool only on the final fastening stage, and hence the fastening operation can become efficient. The operation of performing rotation with fingertips may be omitted as a matter of course. Even in this case, the operation of fastening the nut by the electric torque wrench can be smoothly carried out.

According to the fourth invention of the present invention, the shaft body is solely held or the shaft body is held together with the cylindrical body to determine a direction of the distal end of the hook portion, and the distal end of the hook portion can be easily inserted and hooked in the link of the chain or the ring of the wire member having the ring formed at the end portion thereof.

According to the fifth invention of the present invention, at the time of inserting the hook portion as the first locking portion into the ring, the shaft body of the tension tool does not interfere with the linear material, and the first locking portion of the tension tool can be easily hooked on a halfway position of the linear material stretched with less slack.

According to the sixth invention of the present invention, at the time of sliding the cylindrical body toward the first locking portion side, the end portion of the cylindrical body on the first locking portion side is not hooked on the screw thread of the shaft body, and the cylindrical body can be easily slid.

BEST MODE(S) FOR CARRYING OUT THE INVENTION

Embodiment 1

Figure 1:
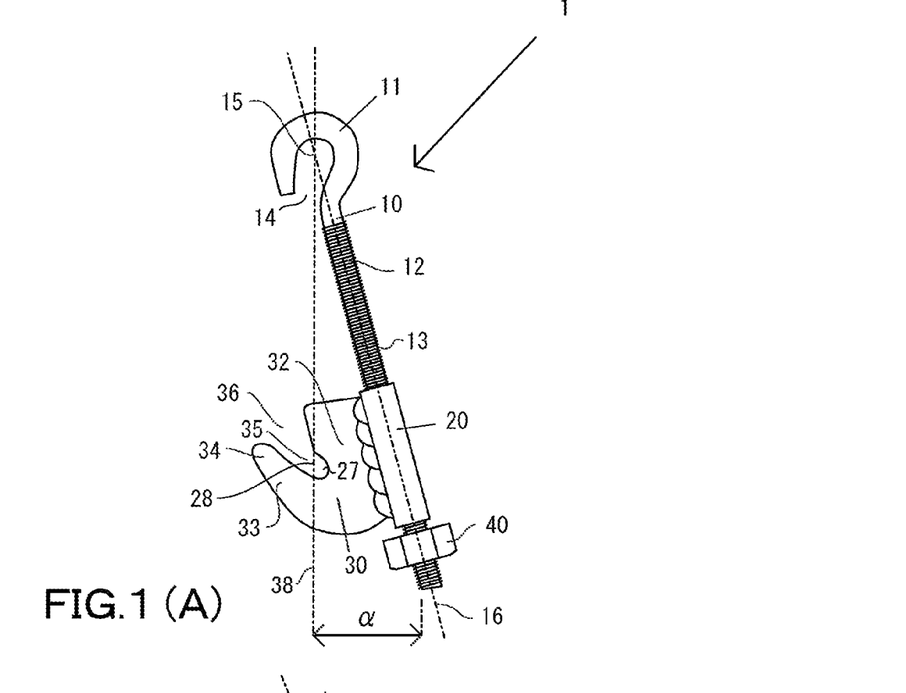
FIG. 1 is a side view (Embodiment 1)
Figure 2:
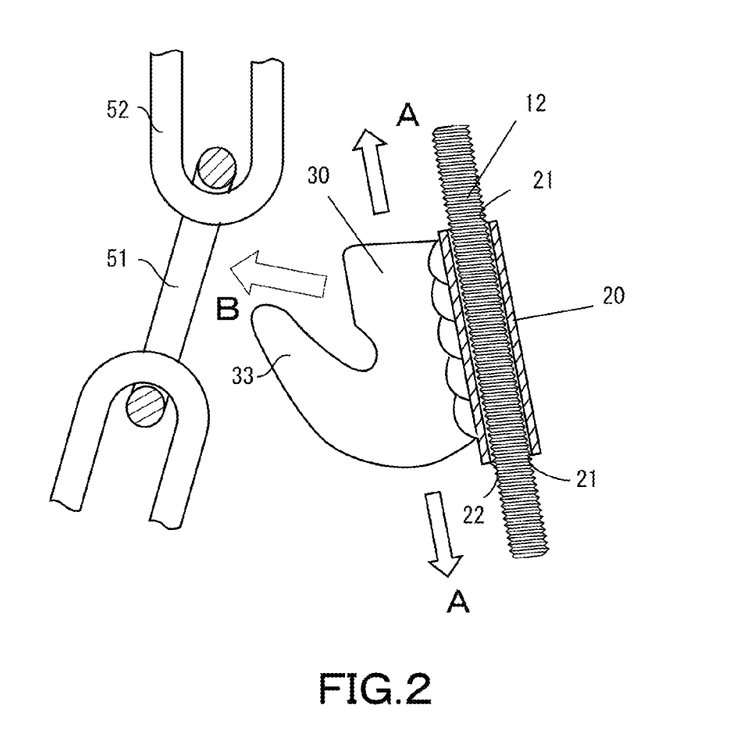
FIG. 2 is a cross-sectional view of a primary part (Embodiment 1)
Figure 3:
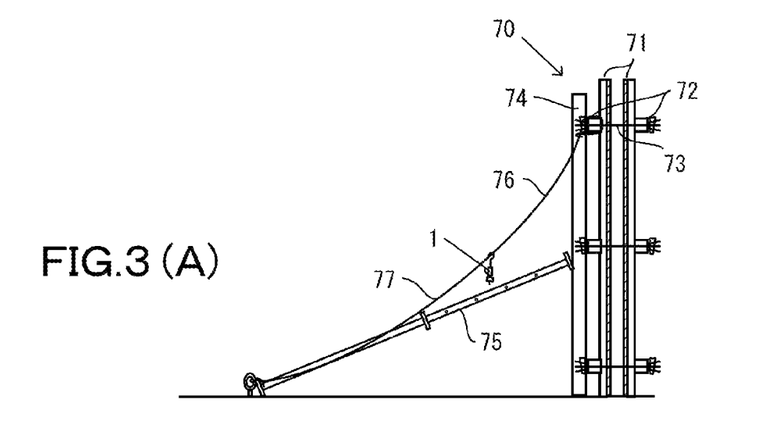
FIG. 3 is an explanatory view of an outline of attachment (Embodiment 1)
Figure 4:
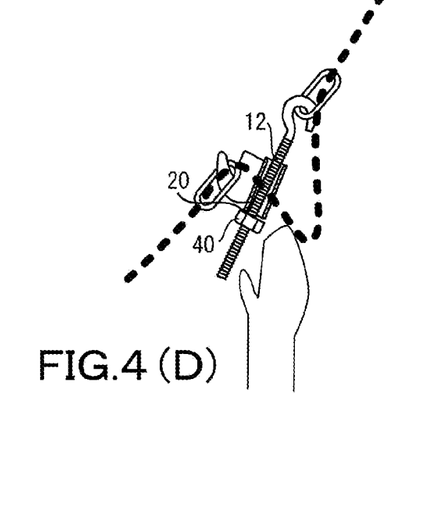
FIG. 4 is an explanatory view of an attachment process (Embodiment 1)
Figure 5:
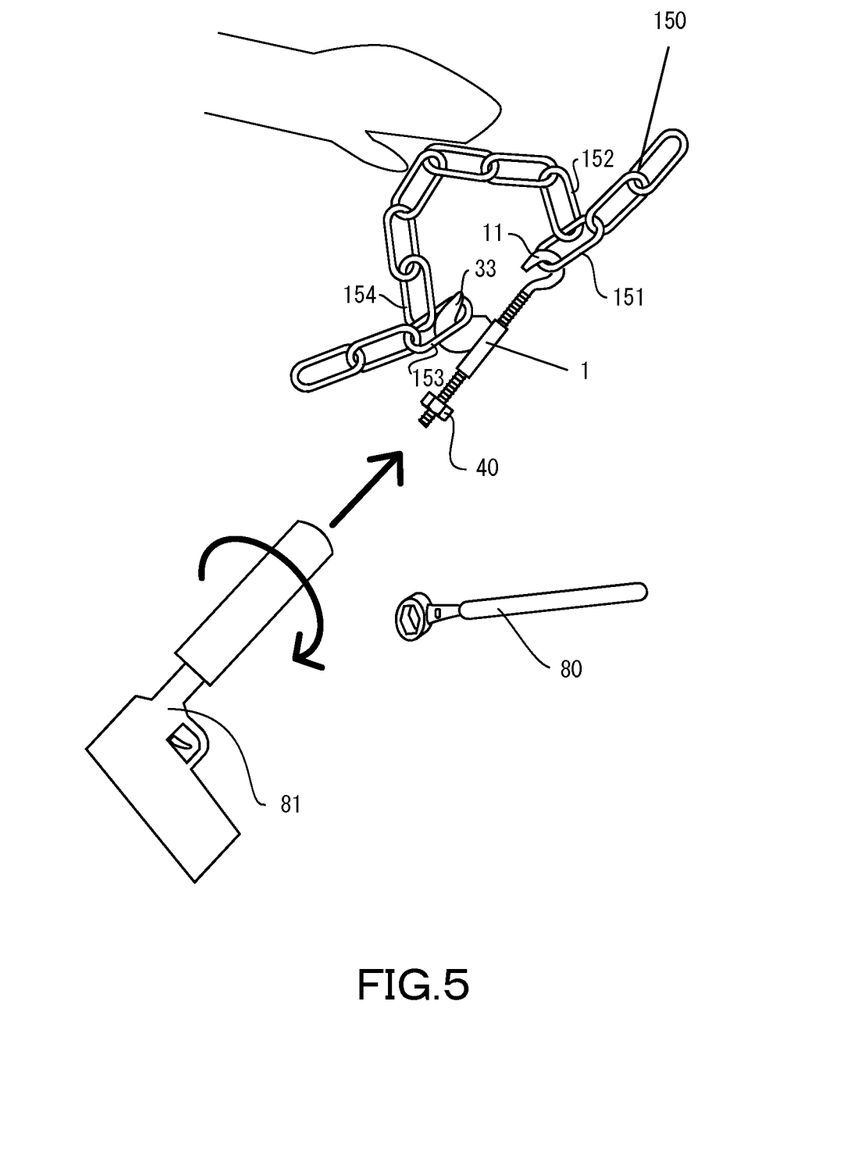
FIG. 5 is an explanatory view when slack is large (Embodiment 1)

In Embodiment 1, an embodiment of a tension tool that binds a position of a concrete form will now be described with reference to FIG. 1 to FIG. 5. FIG. 1 is a side elevation of a tension tool, FIG. 2 is a cross-sectional view of a primary part when a gap between a shaft body and a cylindrical body is small, FIG. 3 is an explanatory view of an outline of attachment in a state that the tension tool is attached to a lateral side of the concrete form, FIG. 4 is an explanatory view of an attachment process of the tension tool when a gap between a shaft body and a cylindrical body is large, and FIG. 5 is an explanatory view of final fastening of the tension tool.

A configuration of a tension tool 1 will now be described with reference to FIG. 1. FIG. 1(A) shows a state before tension, and FIG. 1(B) shows a state after tension. The tension tool 1 is formed of a shaft body 10, a cylindrical body 20 having a locking piece 30 as a second locking portion secured on a lateral side thereof by welding, and a nut 40. The shaft body 10 is formed of a shaft portion 12 and a hook portion 11 having a hook as a first locking portion formed on one tip of the shaft portion 12. A helical screw thread 13 is formed on its periphery to the other shaft end of the shaft portion 12, thereby forming a screw portion. The hook portion 11 at the distal end of the shaft body 10 is formed by bending, an open portion 14 is formed at an obliquely lower part of the bent portion of the hook portion, and a link 51 of a chain is hooked from this open portion 14. A center 15 of the link 51 hooked in the hook portion is placed on a substantially axial line 16 of the shaft body.

The locking piece 30 has a tabular body, and it is formed of a main body portion 32 welded in contact with the cylindrical body 20 and a claw portion 33. An open portion 35 where the hooked link is placed is formed between the main body portion 32 and the claw portion 33. A virtual line 38 connecting a central portion 28 of the open portion 35 with the central portion 15 of the bent portion of the hook portion is formed to cross the axial line 16 at the center 15. As a result, when the linear material is stretched on the virtual line, an operation of fastening the nut 40 that moves the hook portion 11 and the claw portion 33 close to each other can be carried out at a position apart from the virtual line 38 by a predetermined length (a), and there is an advantageous effect that the nut 40 can be fastened by a ratchet wrench 80 having a long shaft or an electric torque wrench 81 (see FIG. 5). A claw distal end 34 of the claw portion 33 faces an obliquely upper side, and the open portion 35 formed of the claw portion 33 and the main body portion 32 has a shape that an open end portion 36 is formed to be wider than a proximal end portion 27 of the claw portion (see FIG. 1(A)). As a result, the craw distal end 34 of the claw portion can be easily inserted into the link 51 of the chain having less slack from the lateral side.

The locking piece 30 as the second locking portion is attached to the cylindrical body 20 by welding. The cylindrical body 20 is fitted onto and attached to an outer periphery of the shaft portion along the axial line of the shaft portion from the end portion of the shaft portion 12. An inner diameter of the cylindrical body 20 is larger than an outer diameter of the shaft portion 12, an outer diameter of the nut 40 is larger than an outer diameter of the cylindrical body 20, the shaft portion 12 is inserted into the cylindrical body 20, and the nut 40 screwed into the shaft body 10 supports the cylindrical body 20 in contact with the cylindrical body 20. When the inner diameter of the cylindrical body 20 is close to the outer diameter of the shaft portion 12, inner nook portions 21 of open end portions in upper and lower parts of the cylindrical body 20 are not caught on the screw thread 13 of the screw portion of the shaft body, and it is possible to obtain an effect that an operation of sliding the cylindrical body with use of an electric torque wrench is smooth without being interfered with the linear material. On the other hand, when the inner diameter of the cylindrical body 20 corresponds to a size that the cylindrical body 20 is obliquely inclined while being fitted on the shaft portion 12, a nook portion 22 of a second locking portion side inner surface in the end portion of the cylindrical body 20 on the nut side is caught on the screw thread 13 of the screw portion, and this position can be temporarily held (see FIG. 4).

The nut 40 has a screw thread, which is matched with the screw thread 13 of the screw portion, formed on the inner surface thereof, and it is screwed from the end portion of the shaft portion 12 in a state that the cylindrical body 20 is attached to the shaft body 10. When the nut 40 is fastened, the locking piece 30 attached to the cylindrical body 20 that is in contact with the nut 40 moves close to the hook portion 11 (see FIG. 1(B)), and the linear material hooked on the first locking portion as the hook portion 11 and the second locking portion as the claw portion 33 is pulled and stretched. In Embodiment 1, although a washer 41 is omitted, the cylindrical body may be supported by the nut 40 through the washer 41 (see FIG. 7). When the washer 41 is used, preferably the washer 41 has a same diameter or a larger diameter than a diameter of the cylindrical body 20.

A description will now be given as to a state where the claw portion 33 of the locking piece 30 as the second locking portion is inserted into a hole of the link 51 of the chain with reference to FIG. 2. The hole of the link 51 into which the claw portion 33 of the second locking portion is inserted is slightly obliquely inclined toward the claw portion 33. Further, in a state that the hook portion 11 as the first locking portion is hooked in the upper link (see FIG. 4(A)), the cylindrical body 20 is inclined with the hook portion 11 at the center, and the cylindrical body 20 is slid in an up-and-down direction along an axial line direction of the shaft portion 12 as indicated by arrows (A) in FIG. 2. Furthermore, the claw portion 33 is moved in a direction of the arrow (B) and inserted into the hole of the link 51 at a position matched with the hole of the link.

Since the second locking portion is formed of a plate body, the claw portion 33 does not interfere with an upper link 52, and the claw portion 33 can be easily inserted into the hole of the link 51 without downwardly displacing from an upper top portion the upper link 52 that is in contact with the hole of the link 51 into which the claw portion 33 is inserted. Moreover, the claw portion 33 can be inclined with the already inserted hook portion at the center, and the claw portion 33 alone can be inserted from the lateral side of the link 51. As a result, even if the chain is stretched with less slack, the claw portion 33 can be inserted into the link at a desired position.

A description will now be given as to an outline of an example applied to a case where a position of a concrete form of a wall of a building is bound from a lateral side with reference to FIG. 3. FIG. 3 is a view for explaining an outline of an attachment state. A concrete form 70 is configured in such a manner that form plates 71 are set upright with a predetermined separation distance therebetween and horizontal square steel pipes 72 hold the separation distance with use of connecting bolts 73 from both sides. A wood square bar 74 is aligned in a vertical direction in contact with the square steel tubes 72, the wood square bar is pressed by an oblique bundle material 75 and obliquely pulled by a chain 76, and the form is bound so that the form cannot be deformed due to vibration or pressure involved in concrete placement.

FIG. 3(A) shows a state that the first locking portion of the tension tool 1 according to this embodiment is hooked on the chain 76 loosely stretched with respect to the bundle material 75. FIG. 3(B) shows a state that the second locking portion of the tension tool 1 according to this embodiment is hooked. FIG. 3(C) shows a state that tension tool 1 according to this embodiment is stretched. According to this embodiment, the first locking portion is hooked in the link of the loose chain 76 (FIG. 3(A)), then the lower chain 77 is pulled in, the second locking portion is hooked (FIG. 3(B)), the nut is fastened, and the tension tool 1 is tensed (see FIG. 3(C)).

An operation of the tension tool after the hook portion 11 is hooked until the nut 40 is fastened will now be described in detail with reference to FIG. 4(A) to FIG. 4(E). In the tension tool in FIG. 4, a description will be given as to a tension tool in which a gap between the shaft body and the cylindrical body is a gap that enables the shaft body to incline in the cylindrical body. In FIG. 4, the chain other than links in which the hook portion 11 as the first locking portion and the claw portion 33 as the second locking portion are hooked is indicated by a broken line. Additionally, to explain a relationship between the cylindrical body 20 and the shaft portion 12, a cross section of the cylindrical body 20 is shown, and an inclined state of the shaft portion 12 inserted in the cylindrical body 20 is shown.

First, to increase a length along which the hook portion 11 and the locking piece 30 move closer to each other, the nut 40 is placed near the end portion of the shaft body in advance. Further, a link of the chain at a desired position is held, and the hook portion 11 formed at the distal end of the shat body 10 is hooked in an opening portion of the link (FIG. 4(A)). Then, a lower portion of a chain 53 is pulled in, a link 51 placed at a position close to the lower side where the claw portion 33 can be easily inserted is selected, the cylindrical body 20 is slid to a position closer to this link, and the claw body 33 is inserted into a hole of the link 51 (see FIG. 4 (B) and FIG. 2). Furthermore, in a state that the claw portion 33 is inserted in the link, the cylindrical body 20 is upwardly slid. Then, the cylindrical body 20 is pulled downward by tensile force of the chain having the link 51 in which the claw portion 33 is hooked, and the cylindrical body 20 is inclined with respect to the shaft portion 12. Moreover, the claw portion side inner nook portion 22 in the lower open end portion of the cylindrical body is caught on the screw thread 13 of the shaft body with which the inner nook portion 22 is in contact, and this position is temporarily held (FIG. 4(C)).

Then, in a state that the cylindrical body is apart from the nut, nut 40 is rotated with fingertips and fastened along the axial line of the shaft portion 12 until the nut 40 comes into contact with the cylindrical body 20 (FIG. 4(D)). The nut 40 can be lightly rotated and fastened with fingertips until the cylindrical body 20 comes into contact with the nut 40, and the fastening operation is very easy. Additionally, after the cylindrical body 20 has come into contact with the nut 40, retightening is carried out with use of a tool such as a ratchet wrench 80 or an electric torque wrench 81 (see FIG. 5). In a state that the nut 40 is in contact with an entire bottom surface of the cylindrical body 20 and slightly fastened, the lower end portion 22 of the cylindrical body is parallel to the nut, and the state of the lower nook portion 22 is caught on the screw thread 13 of the shaft body is canceled. Further, when retightening is effected by the tool, the claw portion 33 moves closer to the hook portion 11, and the chain with slack is tensed (FIG. 4(E)). It is needless to say that the operation of performing rotation with fingertips may be omitted. In this case, the operation of fastening the nut can be smoothly performed by using a tool, e.g., the electric trench wrench.

A description will now be given as to a case where selection of a link to which the claw portion is disposed is not appropriate and slack of the chain cannot be sufficiently removed even though the nut is fastened. When a turnbuckle is used to stretch the chain, it is difficult to insert two hooks of the turnbuckle into links of the chain with less slack, a body portion of the turnbuckle and the chain are aligned in proximity even if the turnbuckle is attached, and hence rotating the body portion is very difficult. However, according to the present invention, the tension tool can be added to the chain from which slack has not been sufficiently removed. Moreover, since the nut 40 is placed at a position apart from the chain, an advantageous effect that a tool such as a ratchet wrench 80 or an electric torque wrench 81 can be easily operated can be obtained.

An operation of attaching the tension tool 1 when slack of a chain is considerable will now be described with reference to FIG. 5. When slack of a chain 150 is considerable, a link 152 below a link 151 of the chain in which a hook portion 11 as a first locking portion is hooked is displaced upward so that insertion of the hook portion 11 cannot be obstructed, and the claw portion 11 is hooked on a lower end portion of the link 151. Additionally, in regard to a link 153 of the chain in which a claw portion 33 as a second locking portion is hooked, an upper link 154 that is in contact with the link 153 is moved downward, and the claw portion 33 is hooked on an upper end portion of the link 153 of the chain. Further, a nut 40 can be fastened and the chain can be stretched by using a tool such as a ratchet wrench 80 or an electric torque wrench 81. According to the invention of this embodiment, even if slack of the chain is considerable, the chain can be easily stretched.

Embodiment 2

Figure 6:
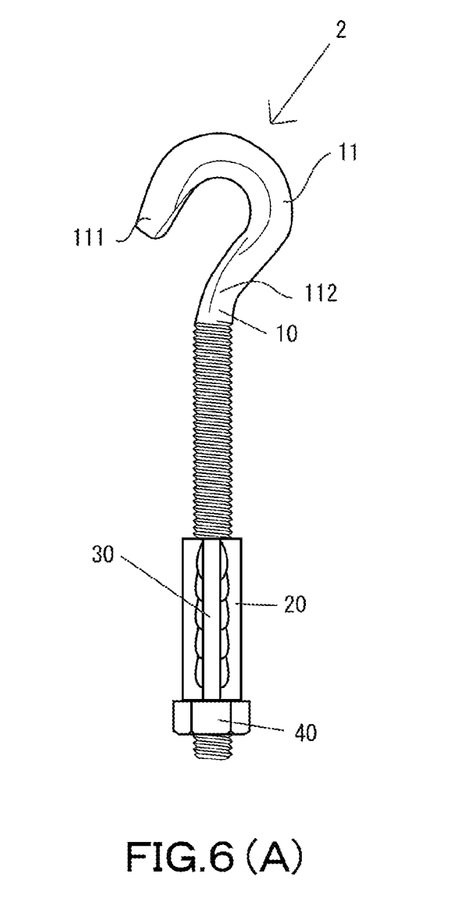
FIG. 6 is a side elevation and a front view (Embodiment 2)

In Embodiment 2, a description will now be given as to a tension tool 2 in which a distal end of a hook portion 11 is bent toward the lateral side from a position near a top portion of a bent portion with respect to a plane along which the hook is bent and extended from a proximal end portion of the hook portion with reference to FIG. 6. FIG. 6(A) is a front view of the tension tool 2, and FIG. 6(B) is a side elevation of the tension tool 2. In this embodiment, a distal end portion 111 of the hook portion 11 formed at the distal end of the shaft portion is bent toward the lateral side with respect to a plane 113 along which the hook portion 11 is bent and extended from a proximal end portion 112 (see FIG. 6(B)). Like reference numerals denote portions having the same configuration as those in Embodiment 1, and a description thereof will be omitted.

When a chain has less slack and a stretching direction of the chain is parallel to a direction of a shaft portion of the tension tool, it may be difficult to hook the hook portion in a hole of a link of the chain in some cases. However, according to the tension tool 2 having the distal end portion 111 of the hook portion bent toward the lateral side, since the direction of the shaft portion 12 of the tension tool deviates from the stretching direction of the chain, the distal end 111 of the hook portion 11 can be easily inserted into the hole of the link. According to this embodiment, it is possible to obtain an advantageous effect that the tension tool can be further easily disposed to a linear material stretched with less slack and an operation can be facilitated.

The distal end portion 111 of the hook portion of the first locking portion is inserted into the hole of the link, then the shaft portion 12 of the tension tool is arranged to be parallel to the stretching direction of the chain, a cylindrical body 20 is rotated in a periaxial direction so that a locking piece 30 can face the chain side, and a claw portion 33 is inserted into a desired link hole from the lateral side. Subsequent operations are the same as those shown in FIG. 4(C) to FIG. 4(E) in the first embodiment.

Embodiment 3

Figure 7:
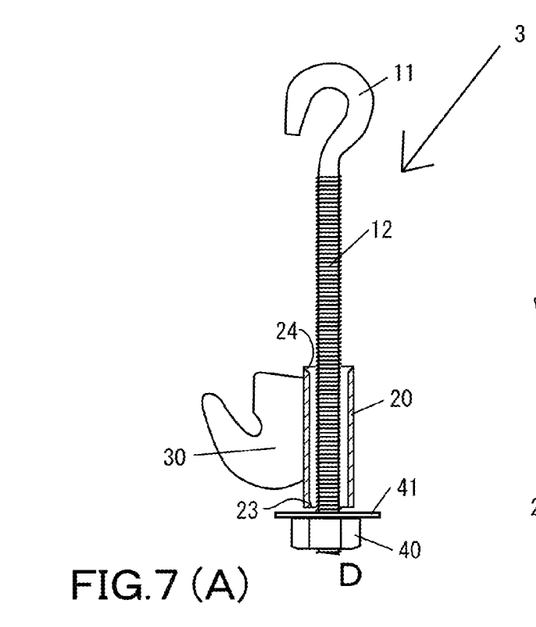
FIG. 7 is a cross-sectional view of a primary part (Embodiment 3)

In Embodiment 3, a description will be given as to an embodiment where an engagement portion is formed on an end portion of a second locking portion side inner surface of a cylindrical body on a nut side with reference to FIG. 7. FIG. 7 is an explanatory view of a tension tool 3 having an engagement portion 23 formed in a cylindrical body. FIG. 7(A) is a partial cross-sectional view showing a tension tool before attachment, FIG. 7(B) is an enlarged perspective view of a primary part showing a lower portion of a cylindrical portion from a lower side in perspective, and FIG. 7(C) is a partial cross-sectional view showing a state that the cylindrical body is temporarily locked to a screw portion of a shaft body.

In the tension tool 3, a lower open end portion of a cylindrical body 20 on a claw portion side is pressed inward, and a convex portion is formed on the inner side of the cylindrical body, thereby forming an engagement portion 23 (see FIG. 7(B)). Furthermore, the inside of an upper open end portion of the cylindrical body is ground to form a chamfer 24. Moreover, a washer 41 is fitted between the cylindrical body 20 and the nut 40. Other structures are the same as Embodiment 1, and hence like reference numerals denote these structures to omit a description thereof.

In the tension tool 3, likewise, the tension tool is disposed to a chain by the operation method shown in FIG. 4. In a state that the cylindrical body 20 is pulled up, tensile force acts in arrow directions (D) shown in FIG. 7(C), the cylindrical body 20 is inclined, the engagement portion 23 is caught on a screw thread 13 of a shaft body, and it is temporarily locked. In the tension tool 3, since the engagement portion 23 for the screw thread 13 of the screw portion is formed on the lower end inner surface of the cylindrical body 20 on the second locking portion side, even if an inclination angle of the cylindrical body 20 relative to the shaft portion 12 is small, locking can be assuredly temporarily effected. Further, the inner surface of the upper end portion of the cylindrical body is chamfered 24, and the upper end portion 25 of the engagement portion is formed at a slant so that it cannot be caught on the screw thread 13 of the screw portion. As a result, in the operation process shown in FIG. 4 (D) to FIG. 4 (E), even if the shaft portion 12 is inclined in the cylindrical body 20, the nut 40 can be smoothly fastened, the cylindrical body 20 can be easily slid, and the tension tool can be disposed.

Embodiment 4

Figure 8:
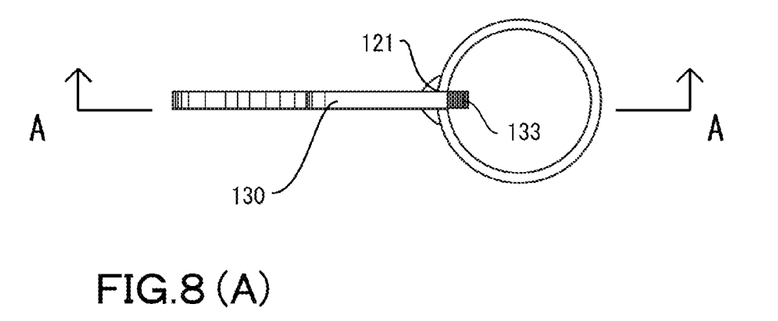
FIG. 8 is an explanatory view of a cylindrical body (Embodiment 4)

In Embodiment 4, a description will be given as to an embodiment that a plate piece 130 as a second locking portion is inserted in an axial direction of a tube 120 that constitutes a cylindrical body. FIG. 8(A) is a plan view of a cylindrical body of this embodiment, and FIG. 8(B) is a cross-sectional view taken along a position A-A in FIG. 8(A). In this embodiment, a slit 121 having a width that enables the plate piece as the second locking portion to be inserted is formed in the axial direction of the cylindrical tube 120 as a cylindrical body, and the plate piece 130 having a thickness matched with the slit is inserted into the cylindrical body and welded.

An upper end portion 131 of the plate piece as the second locking portion is prevented from entering the cylindrical body too much, and a lower end portion 132 of the same protrudes toward the inside of the cylindrical body and forms a corner portion in the cylindrical body. Moreover, a longitudinal edge portion 133 of the plate piece 130 on the inner surface side of the cylindrical body that connects the upper end portion 131 with the lower end portion 132 is formed so as to be smoothly and continuously inclined, and the plate piece protruding in the cylindrical body forms an engagement portion 123. In a shape of the plate piece as the second locking portion, a shape outside the cylindrical body is the same as the tension tool 1, and hence like reference numerals are used in the drawing to omit a description thereof. In Embodiment 4, the cylindrical body can be temporarily locked with respect to a screw thread of a shaft body while pulling up the cylindrical body by the same operation as the tension tool 3, and other operations and effects are also the same as those of Embodiment 3 (see FIG. 4 and FIG. 7).

In case of removing the tension tool according to each of Embodiment 1 to Embodiment 4, the nut 40 can be loosened. At the time of removing the tension tool, if the engagement portion 23 or the like of the cylindrical body is caught on and locked with respect to the screw thread 13 of the shaft body, unlocking can be effected by lightly hitting the lower side of the second locking portion 30 (130), the cylindrical body can be slid, and the tension tool can be easily removed.

Embodiment 5

Figure 9:
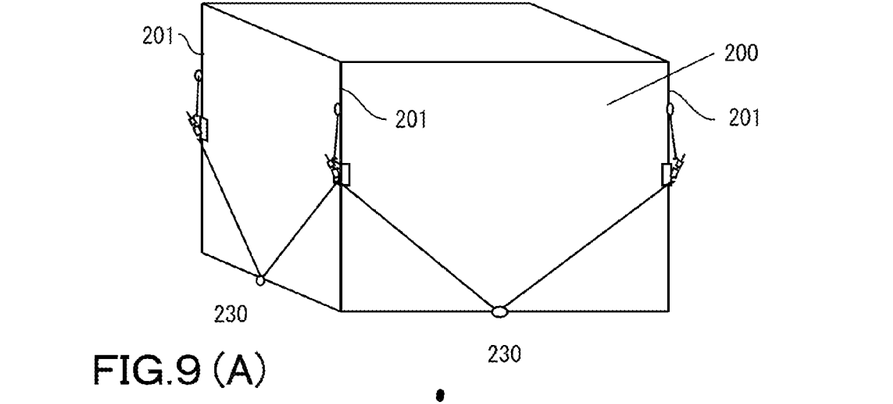
FIG. 9 is an explanatory view of an outline of attachment (Embodiment 5)

In Embodiment 5, a description will be given as to an embodiment where a tension tool is disposed to a rectangular object through an abutting jig. FIG. 9(A) is an overall perspective view, and FIG. 9(B) is an enlarged perspective view of a primary part. In this embodiment, an abutting jig 210 is arranged to abut on a vertical corner ridge portion 201 of a rectangular object 200, a tension tool is disposed, and a position of the rectangular object is bound. The rectangular object in Embodiment 5 may be any object such as a container or a concrete form formed into a rectangular shape. In case of a container, the container is fixed so that it cannot be displaced due to vibration and, in case of a concrete frame, it is bound so that a frame shape cannot be deformed due to a placement pressure.

The abutting jig 210 is constituted of plate bodies 211, 211 abutting on two surfaces sandwiching the corner ridge portion 201 and a plate body 212 protruding outward from the corner ridge portion, and a cylindrical body 213 into which a shaft portion of the tension tool is inserted is formed at a distal end of the protruding plate body 212 so as to incline with respect to the corner ridge line 201. The shaft portion 12 of the tension tool is inserted into the cylindrical body 213, then a second locking portion 20 is inserted into the shaft portion 12, and a washer 41 and a nut 40 are attached, thereby constituting the tension tool 5.

In Embodiment 5, the abutting jig 210 that abuts on the corner ridge portion 201 is inserted between a hook portion 11 of a shaft body and the cylindrical body 20 in advance, the abutting jig 210 is pressed against the ridge portion 201, linear materials 220 and 221 hooked in the hook portion 11 and a claw portion 33 are stretched, and the rectangular object 200 is bound. In Embodiment 5, the lower linear material 220 is different from the upper linear material 221. The lower linear material 220 is stretched from a central portion 230 at each bottom of the rectangular object to a central portion 230 of an adjacent bottom through the hook portion 11.

An upper end portion of the upper linear material 221 is fixed to an upper portion of the rectangular object 200, and a ring 223 is attached to a lower end portion of the linear material 221 and hooked in the claw portion 33. In a state shown in FIG. 9, when the linear materials 221 and 220 are tensed, tensile force in an oblique direction acts on a bottom portion of the rectangular object at a position of each abutting jib. The obliquely acting tensile force prevents the rectangular object 200 from being lifted up, and it holds a position of the rectangular object 200 with respect to external force acting in a horizontal direction. As a result, the rectangular object can be bound with a small number of the tension tools 5, and a position of this object can be fixed.

Embodiment 6

Figure 10A:
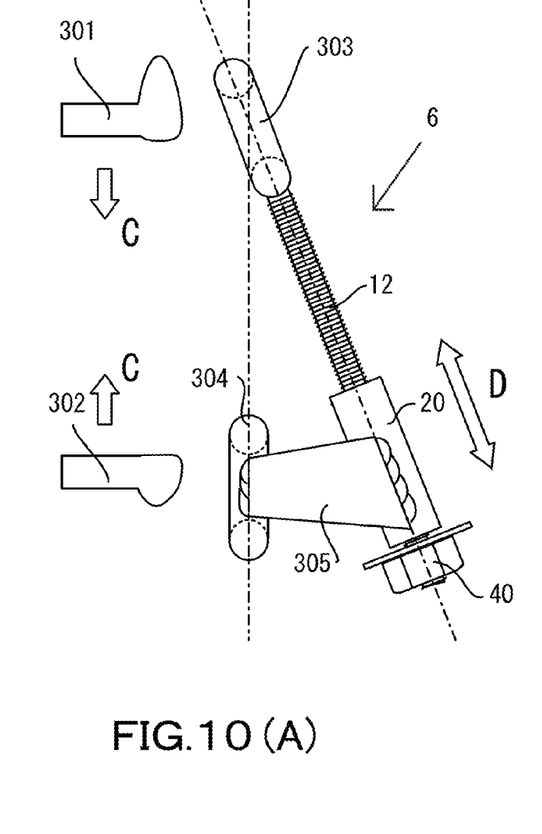
FIG. 10 is an explanatory view of an outline of attachment (Embodiment 6).
Figure 10B:
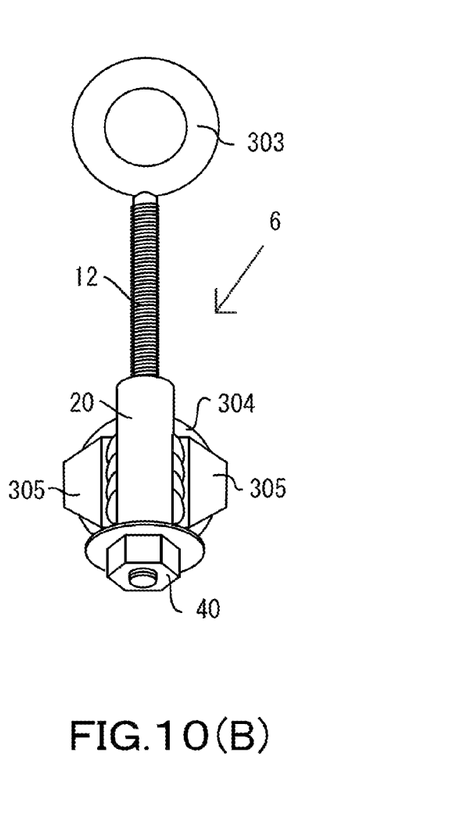

In Embodiment 6, a description will be given as to an embodiment where a first locking portion and a second locking portion of a tension tool 6 are rings with reference to FIG. 10. FIG. 10(A) is a side elevation of the tension tool 6, and FIG. 10(B) is a front view of the tension tool 6. Distal ends of two locked portions as a first region and a second region are expanded and formed into protruding bodies 301 and 302 protruding from the locked bodies. The protruding body 301 is formed to greatly expand toward the upper direction so that a ring 303 formed at a tip of a shaft body of the tension tool 6 can be hooked on it. Further, the upper ring 303 hooked as described above is used as a supporting point, a lower ring 304 is inclined toward the lower protruding body 302, a cylindrical body 20 is slid along a shaft portion 12 in this state (a direction of an arrow (D) in FIG. 10(A)), and the lower ring 304 is fitted onto the lower protruding body 302. Furthermore, when a nut 40 is fastened, a distance between the upper protruding body 301 and the lower protruding body 302 is reduced (directions of arrows (C) in FIG. 10(A)).

Giving a detailed description on a configuration of the tension tool 6, the shaft portion 12 extends downward from one end of the upper ring 303, and a thread is formed from the other end of the shaft portion 12 to the upper ring 303. Plate bodies 305, 305 are attached to both side surfaces of the cylindrical body 20 by welding, and the lower ring 304 is attached to distal ends of the two plate bodies by welding. Moreover, a washer 41 and the nut 40 are screwed from a shaft end of the shaft portion 12. A virtual line connecting the center of the lower ring 304 and the center of the upper ring 303 is obliquely formed with respect to a shaft center of the shaft portion 12. A fastening position of the nut is a position apart from the two locked portions, thereby facilitating fastening of the nut. According to the tension tool 6, even in case of binding, e.g., a wheelchair to a wheelchair carrying vehicle or the like, since a hook and others are not attached to the tension tool, a position of the wheelchair can be safely bound. Although the description has been given as to the drawing where the two protruding bodies 301 and 302 are vertically arranged to facilitate understanding, a direction of these bodies is not restricted.

(Others)

In Embodiment 1 to Embodiment 3, the arrangement where the hook portion is placed on the upper side has been explained to facilitate understanding, but an installing direction of the tension tool is not restricted as a matter of course.

In each of Embodiment 1 to Embodiment 5, although the embodiment using the tension tool that tenses the linear material has been explained, the tension tool that binds positions of two objects may be adopted like Example 6, and it may be used as, e.g., a fixture for an overland vehicle or a furniture overturning preventive tool besides a wheelchair.

Although a metal is preferred as a material of the tension tool, a resin material may be used without being restricted to the metal.

Although the plate body has been explained as an example of the second locking portion, this portion is not restricted to the plate body, and it may be a bar-shaped body protruding while inclining toward the first locking portion.

Although the cylindrical body is formed of a tube having a circular cross section, but the cylindrical body may be formed by bending a plate, and its cross section is not restricted to a circular cross section, and a tube having, e.g., a square or a hexagonal shape may be used.

The foregoing embodiments are examples of the embodiments according to the present invention, even if a material of the plate body or the engagement conformation is changed or combinations are changed, any change within the range of the gist of the present invention is obviously included in the technical scope of the present invention.

The foregoing embodiments are illustrative examples in all aspects, and it should be considered that they are not restrictive. The technical scope of the present invention is shown by claims without being limited to the above explanation, and it is intended to include meanings equal to claims and all changes in the scope.

REFERENCE SIGNS LIST 1, 2, 3, 5, and 6 . . . tension tool, 10 . . . shaft body, 20 . . . cylindrical body, 30 . . . locking piece, 40 . . . nut, 41 . . . washer, 11 . . . hook portion, 12 . . . shaft body, 13 . . . screw thread, . . . open portion, 15 . . . central portion, 16 . . . axial line, 21 and 22 . . . nook portion, 23 . . . engagement portion, 24 . . . chamfer, 25 . . . upper end portion, 27 . . . proximal end portion, . . . central portion . . . main body portion, 33 . . . claw portion, 34 . . . claw distal end, 35 . . . open portion, 36 . . . open end portion, 38 . . . virtual line, . . . concrete form, 71 . . . form plate, 72 . . . square steel pipe, 73 . . . connecting bolt, 74 . . . wood square bar, 75 . . . bundle material, 80 . . . ratchet wrench, 81 . . . electric torque wrench, 51, 52, 151, 152, 153, and 154 . . . link, 53, 76, 77 . . . chain, 111 . . . distal end portion, 112 . . . proximal end portion, 113 . . . surface, 120 . . . tube, 121 . . . slit, 123 . . . engagement portion, 130 . . . plate piece, 131 . . . upper end portion, 132 . . . lower end portion, 133 . . . longitudinal edge portion, 200 . . . rectangular object, 201 . . . corner ridge portion, 210 . . . abutting jig, 211 and 212 . . . plate body, 213 . . . cylindrical body, 220 and 221 . . . linear material, 230 . . . central portion, 223 . . . ring, 301 and 302 . . . protruding body, 303 and 304 . . . ring, 305 . . . plate body

The invention claimed is:

1. A tension tool comprising:
a shaft body;
a cylindrical body; and
a nut,
wherein a first locking portion that locks at a first region is formed at one end portion of the shaft body, and a screw portion is formed from the other end portion of the same toward the first locking portion,
wherein the cylindrical body is fitted onto an outer periphery of the screw portion, and a second locking portion that locks at a second region is formed on an outer surface of the cylindrical body,
wherein the screw portion has the nut attached thereto in a state that the cylindrical body is fitted on the outer periphery of the shaft body,
wherein the first region and the second region, which are apart from each other, are moved closer to each other by fastening the nut,
wherein the cylindrical body is fitted on the outer periphery of the screw portion in a slidably freely fitted state to form a gap therebetween,
wherein a virtual line connecting a first receiving portion that is in contact with the first region in the first locking portion with a second receiving portion that is in contact with the second region in the second locking portion and an axial line formed by a shaft center of the shaft body are inclined,
wherein a width of the gap is a width that enables the shaft body to incline in the cylindrical body and also enables an inner surface corner portion of the cylindrical body near the second locking portion to be hooked on a screw thread of the shaft body in a state that the first locking portion is slid and pulled toward the second locking portion and the cylindrical body is inclined,
wherein an engagement portion relative to a screw thread of the screw portion is formed on a second locking portion side inner surface of the nut side end portion in the cylindrical body, and
the nut side of the engagement portion is protruded toward the screw thread side, the cylindrical body inner side of the engagement portion is the same surface as the cylindrical body inner surface, and the engagement portion in the cylindrical body is formed at a slant with respect to the shaft portion.

2. The tension tool according to claim 1,
wherein the first region and the second region are regions in a linear material, and the first locking portion is a hook portion.

3. The tension tool according to claim 2,
wherein a distal end of the hook portion is bent toward the lateral side from a position near a top portion of a bent portion with respect to plane along which the hook is bent and extended from a proximal end portion of the hook portion.

4. The tension tool according to claim 1,
wherein the inner surface of the cylindrical body is chamfered at a side end portion of the second locking portion of the cylindrical body.

* * * * *